United States Patent
McCann et al.

(10) Patent No.: US 8,447,349 B2
(45) Date of Patent: May 21, 2013

(54) METHOD AND APPARATUS FOR INTER-TECHNOLOGY HANDOFF OF A MULTI-MODE MOBILE STATION

(75) Inventors: Peter J. McCann, Naperville, IL (US); George Cherian, San Diego, CA (US); Poornima A. Lalwaney, San Diego, CA (US); Philip R. Roberts, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 864 days.

(21) Appl. No.: 12/363,847

(22) Filed: Feb. 2, 2009

(65) Prior Publication Data
US 2009/0207808 A1 Aug. 20, 2009

Related U.S. Application Data

(60) Provisional application No. 61/028,963, filed on Feb. 15, 2008.

(51) Int. Cl.
*H04M 1/00* (2006.01)
(52) U.S. Cl.
USPC ........ 455/552.1; 455/436; 455/439; 455/442; 370/329; 370/331
(58) Field of Classification Search
USPC ........... 455/436, 437, 439, 442, 552.1, 550.1, 455/414.1, 168.1; 370/329, 331, 334, 354, 370/355, 356
See application file for complete search history.

(56) References Cited

U.S. PATENT DOCUMENTS

| | | | |
|---|---|---|---|
| 6,950,657 B1 | 9/2005 | Hiller et al. | |
| 7,162,236 B2 * | 1/2007 | Dorenbosch et al. | 455/432.1 |
| 7,227,848 B2 | 6/2007 | Sayeedi et al. | |
| 7,230,921 B2 | 6/2007 | Eriksson et al. | |
| 7,406,324 B1 * | 7/2008 | McConnell | 455/466 |
| 7,711,366 B1 * | 5/2010 | O'Neil et al. | 455/438 |
| 7,899,064 B2 * | 3/2011 | Kim et al. | 370/395.52 |
| 2003/0104814 A1 | 6/2003 | Gwon et al. | |

(Continued)

OTHER PUBLICATIONS

Jung, Sung Yun: "The International Search Report and the Written Opinion of the International Searching Authority, or the Declaration", Korean Intellectual Property Office, Daejeong Republic of Korea, completed: Nov. 10, 2009, mailed: Nov. 10, 2009.

(Continued)

*Primary Examiner* — Jean Gelin
(74) *Attorney, Agent, or Firm* — Steven A. May

(57) ABSTRACT

A communication system reduces set up time for an inter-technology handoff of a multi-mode mobile station (MS) from a source network associated with a first radio frequency (RF) technology to a target network associated with a second RF technology by pre-establishing, prior to a determination to handoff the MS, a registration state of the MS and an authentication of the MS in association with the target network and second RF technology. In order to pre-establish the registration state and authentication, the MS exchanges messaging of the second RF technology with the second network via the first network and first RF technology. To facilitate the exchange, the MS includes shims in a second protocol stack associated with the second technology, which shims intercept second protocol stack signaling and redirect the intercepted signaling to a first protocol stack of the MS, associated with the first technology, for tunneling to the source network.

18 Claims, 4 Drawing Sheets

U.S. PATENT DOCUMENTS

| | | | |
|---|---|---|---|
| 2005/0163078 | A1 | 7/2005 | Oba et al. |
| 2006/0077934 | A1 | 4/2006 | Lee et al. |
| 2006/0146803 | A1 | 7/2006 | Bae et al. |
| 2006/0159047 | A1* | 7/2006 | Olvera-Hernandez et al. ............ 370/331 |
| 2008/0049675 | A1* | 2/2008 | Burgan et al. ............ 370/331 |
| 2008/0101292 | A1* | 5/2008 | Sengupta et al. ............ 370/331 |
| 2008/0298321 | A1* | 12/2008 | Lee et al. ............ 370/331 |
| 2009/0016302 | A1* | 1/2009 | Shaheen ............ 370/331 |
| 2010/0150110 | A1* | 6/2010 | Dutta et al. ............ 370/331 |
| 2011/0064058 | A1* | 3/2011 | Rimoni et al. ............ 370/332 |

OTHER PUBLICATIONS

Choi, H., et al., "A Seamless Handoff Scheme for UMTS-WLAN Interworking," Global Telecommunications Conference, GLOBECOM, IEEE, 2004.

International Preliminary Report on Patentability for counterpart International Patent Application No. PCT/US2009/033851 mailed on Aug. 26, 2010.

McCann, P., "Make-Before-Break Handoffs with Mobile IPv4 draft-mccann-mip4-mbb-00.txt," Internet-Draft, Network Working Group, Nov. 13, 2007.

Supplementary European Search Report for European Patent Application No. 09711114, European Patent Office, The Hague, Netherlands, mailed on Feb. 21, 2012.

"3rd Generation Partnership Project; Technical Specification Group Services and System Aspects; Architecture enhancements for non-3GPP accesses (Release 8)," 3GPP Standard; 3GPP TS 23.402, 3rd Generation Partnership Project, No. V8.0.0, Dec. 1, 2007.

"3rd Generation Partnership Project; Technical Specification Group Radio Access Network; Improved Network Controlled Mobility between E-UTRAN and 3GPP2/Mobile WiMAX Radio Technologies," 3GPP TR 36.938 vol. 41 Marked, 3rd Generation Partnership Project, Nov. 12, 2007.

* cited by examiner

METHOD AND APPARATUS FOR INTER-TECHNOLOGY HANDOFF OF A MULTI-MODE MOBILE STATION

CROSS-REFERENCE(S) TO RELATED APPLICATION(S)

The present application claims priority from provisional application Ser. No. 61/028,963, entitled "METHOD AND APPARATUS FOR INTER-TECHNOLOGY HANDOFF OF A MULTI-MODE MOBILE STATION," filed Feb. 15, 2008, which is commonly owned and incorporated herein by reference in its entirety.

FIELD OF THE INVENTION

The present invention relates generally to wireless communication systems, and more specifically to handoff of a multi-mode mobile station between networks implementing different air interface technologies.

BACKGROUND OF THE INVENTION

The evolution of cellular communications has resulted in a proliferation of networks of different technologies and corresponding different air interfaces. As a result, during the course of a single communication session, a wireless mobile station may roam among multiple networks, wherein each such network implements a different technology than the other networks of the multiple networks. Among the different network technologies are third generation (3G) technologies, for example, 3GPP (Third Generation Partnership Project) technologies such as UMTS (Universal Mobile Telecommunication System) and its derivatives such as 3GPP LTE (Long Term Evolution), 3GPP2 technologies such as CDMA (Code Division Multiple Access) 2000 1XEVDO (Evolution Data Only) (also referred to as 3GPP2 HRPD (High Rate Packet Data)), and various OFDM (Orthogonal Frequency Division Multiplexing) technologies such as IEEE (Institute of Electrical and Electronics Engineers) 802.xx systems, for example, networks operating pursuant to the 802.11, 802.15, 802.16, or 802.20 standards.

A multi-mode mobile station (MS) supports two or more air interface technologies. As the MS roams among networks supporting different technologies and air interfaces, it may be beneficial to system performance to handoff the MS from one such network to another. If the MS contains a separate, complete implementation of each air interface technology, then handoff can be accomplished without interaction between the base stations of the two technologies. This is because the connection to the new air interface technology can progress independently of the old connection to the old air interface technology. This requires no change to the specification of either technology because the handoff is handled completely by the MS without network involvement.

It is likely that the designer of a multi-mode MS, in an effort to minimize cost, will attempt to share some components among two or more of the air interface technologies. For example, a cellular phone that implements two technologies might be capable of receiving on both simultaneously but is only able to transmit on one at a time due to sharing the same transmit chain. Even if there were two separate transmit chains, it may still be desirable to transmit on only one at a time to minimize radio frequency interference between the two. However, a sharing of transmit or receive chains in an MS can result in a handoff delay as the MS alternates communicating with each of a source network and a target network. For real-time applications such as Voice-over-Internet Protocol (VoIP), it is desirable to minimize the total handoff time to make the user experience as seamless as possible.

Therefore, a need exists for a method and apparatus for an inter-technology handoff that minimizes a total handoff time of an inter-technology handoff of a multi-mode MS.

Figure 1:
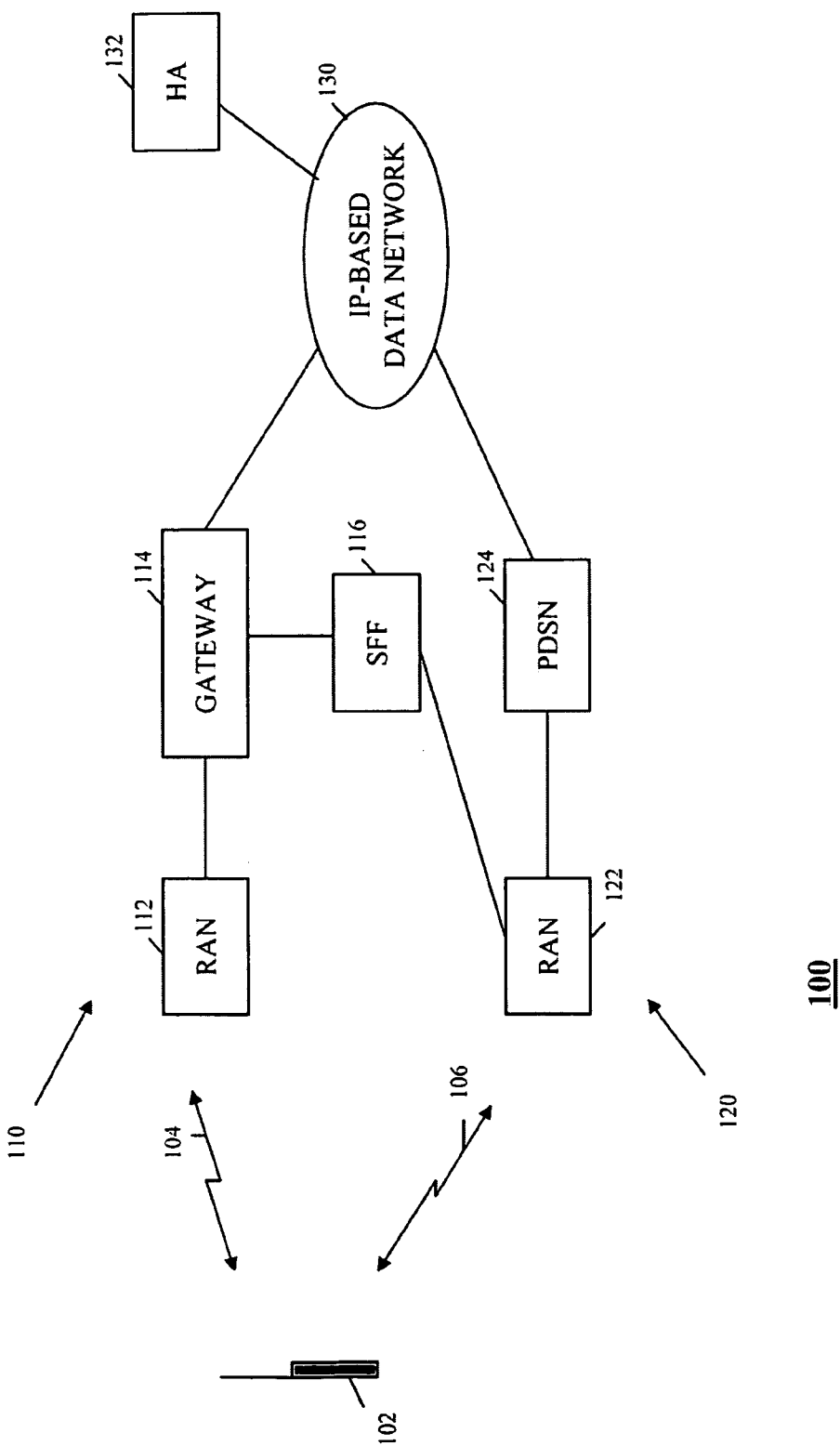
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and apparatus for an inter-technology handoff that minimizes a total handoff time of an inter-technology handoff of a multi-mode mobile station (MS), a communication system is provided that reduces set up time for an inter-technology handoff of the MS from a source network associated with a first radio frequency (RF) technology to a target network associated with a second RF technology by pre-establishing, prior to a determination to handoff the MS, a registration state of the MS and an authentication of the MS in association with the target network and second RF technology. In order to pre-establish the registration state and authentication, the MS exchanges messaging of the second RF technology with the second network via the first network and first RF technology. To facilitate the exchange, the MS includes shims in a second protocol stack associated with the second technology, which shims intercept second protocol stack signaling and redirect the intercepted signaling to a first protocol stack of the MS, associated with the first technology, for tunneling to the source network.

Generally, an embodiment of the present invention encompasses a method performed by a multi-mode MS for an inter-technology handoff of a communication session from a first network associated with a first RF technology to a second network associated with a second RF technology. The method includes exchanging bearer data with the first network via the first RF technology, intercepting signaling of the second RF technology, tunneling the intercepted signaling via the first RF technology, establishing a registration state in the second network via the first RF technology and without directing bearer data to the second RF technology, and subsequent to establishing a registration state in the second RF technology, handing off to the second RF technology and ceasing the intercepting of signaling of the second RF technology and tunneling the intercepted signaling via the first RF technology.

Another embodiment of the present invention encompasses a multi-mode MS capable of operating in each of a first network associated with a first RF technology and a second network associated with a second RF technology. The MS includes at least one transceiver for transmitting and receiving RF communications and at least one memory device that maintains a first protocol stack associated with the first RF technology and a second protocol stack associated with the second RF technology, wherein the second protocol stack comprises a shim that intercepts second protocol stack signaling and redirects the intercepted signaling to the first protocol stack for tunneling to the first network. The MS further includes a processor coupled to the at least one memory device and the at least one transceiver that implements the first and second protocol stacks.

Yet another embodiment of the present invention encompasses a method for an inter-technology handoff of a communication session from a first RF technology to a second RF technology. The method includes exchanging bearer data with an MS via the first RF technology, receiving, via the first RF technology, a Mobile Internet Protocol (MIP) request to authenticate the MS to provide IP services in association with the second RF technology, wherein the request does not trigger a rerouting of traffic to the MS via the second RF technology, and receiving, via the first RF technology, a request to assign a routing identifier to the MS by use of MIP and in association with the second RF technology, wherein the request does not trigger a rerouting of traffic to the MS via the second RF technology. The method further includes, in response to receiving the authentication request, a mobility agent authenticating the MS in association with the second RF technology and, in response to receiving the a request to assign a routing identifier, assigning a routing identifier in association with the second RF technology. Additionally, the method includes, subsequent to authenticating the MS and assigning a routing identifier in association with the second RF technology, determining to handoff the MS to the second RF technology, handing off the MS to the second RF technology, and rerouting the bearer data by the mobility agent from first RF technology to second RF technology based on a registration request sent on the second RF technology and which does not require further authentication or further routing identifier assignment.

Still another embodiment of the present invention encompasses method for an inter-technology handoff of a communication session involving an MS from a first RF technology to a second RF technology. The method includes exchanging bearer data with an MS via the first RF technology, prior to determining to handoff the communication session to the second RF technology, authenticating the MS in association with the second RF technology and assigning a routing identifier to the MS in association with the second RF technology, determining to handoff the communication session to the second RF technology, and based on the authentication and routing identifier provided prior to determining to handoff, rerouting the bearer data to the second RF technology and binding a home address of the mobile station to the routing identifier.

The present invention may be more fully described with reference to FIGS. 1-6. FIG. 1 is a block diagram of a wireless communication system 100 in accordance with an embodiment of the present invention. Communication system 100 includes multiple packet-based wireless communication networks 110, 120 (two shown) that each implements a different radio frequency (RF), or air interface, technology. By way of example and not intending to limit the invention in any way, one or the other of wireless communication networks 110, 120 may implement a third generation (3G) technology, for example, a 3GPP (Third Generation Partnership Project) technology such as UMTS (Universal Mobile Telecommunication System) and its derivatives such as 3GPP LTE (Long Term Evolution), a 3GPP2 technology such as CDMA (Code Division Multiple Access) 2000 1XEVDO (Evolution Data Only), or one of various OFDM (Orthogonal Frequency Division Multiplexing) technologies, such as an IEEE (Institute of Electrical and Electronics Engineers) 802.xx technology, for example, may operate pursuant to one of the 802.11, 802.15, 802.16, or 802.20 standards.

A first wireless communication network 110 of the multiple wireless communication networks 110, 120 includes a first Radio Access Network (RAN) 112 that is coupled to a first gateway 114. A second wireless communication network 120 of the multiple wireless communication networks 110, 120 includes a second RAN 122 coupled to a second gateway 124. Each of gateways 114, 124 may comprise one or more of a Packet Data Serving Node (PDSN), a Mobile Switching Center Evolution-Emulation (MSCe), a Media Gateway (MGW), a Serving Gateway (Serving GWG), a Public Data Network (PDN) Gateway, and/or other known network elements that provide a connection for a wireless access network to a core network and/or an external data network. Each gateway 114, 124 is further coupled to an Internet Protocol (IP)-based data network 130, and via the data network to a Home Agent (HA) of each mobile station serviced by the corresponding RAN, such as HA 132 with respect to MS 102. As is known in the art, an HA, such as HA 132, acts as a mobility agent for the MSs registered with the HA, maintaining and updating routing information for each such MS and routing bearer data to the MS, wherever the MS may be located. Together, networks 110 and 120, IP-based data network 130, and HA 132 may be collectively referred to herein as an infrastructure of communication system 100.

Each RAN 112, 122 provides wireless communication services to mobile stations 102 (one shown) residing in a coverage area of the RAN via a respective air interface 104, 106. Each air interface 104, 106 includes a forward link (not shown) that includes a paging channel and multiple forward link signaling and traffic channels and further includes a reverse link (not shown) that includes an access channel and multiple reverse link signaling and traffic channels. In one embodiment of the invention, wireless communication network 110 may be a 3GPP LTE (also referred to herein as LTE) network and RAN 112 is an E-UTRAN (Evolved Universal Terrestrial Radio Access Network) that comprises a transceiver, such as an evolved Node B, coupled to a controller, such as a Radio Network Controller (RNC). Also, in such an embodiment, wireless communication network 120 may be a 3GPP2 CMDA 2000 1XEVDO (also referred to herein as EVDO) network, RAN 122 may comprise a transceiver, such as an Access Node (AN), coupled to a Packet Control Function (PCF), and gateway 124 may comprise a PDSN.

Figure 2:
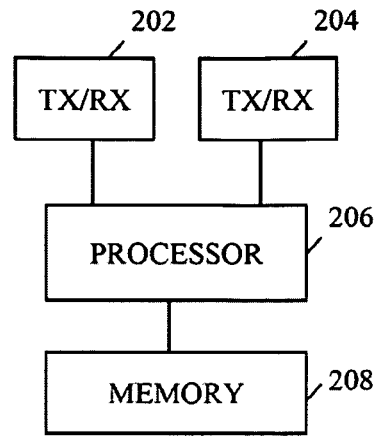
FIG. 2 is a block diagram of a mobile station of FIG. 1 in accordance with an embodiment of the present invention.
Figure 3:
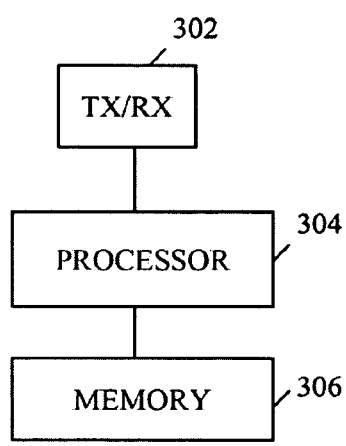
FIG. 3 is a block diagram of the mobile station of FIG. 1 in accordance with another embodiment of the present invention.

MS 102 is a multi-mode MS that is capable of operating in each of networks 110 and 120. For example, MS 102 may be a multi-mode cellular telephone, radiotelephone, or Personal Digital Assistant (PDA), personal computer (PC), or laptop computer equipped for wireless voice communications. In various technologies, an MS such as MS 102 may be referred to as a user's equipment (UE), a subscriber unit (SU), a mobile node (MN), or an access terminal (AT), among other terms. Referring now to FIG. 2, a block diagram is provided of MS 102 in accordance with an embodiment of the present invention. In one embodiment of the present invention, MS 200 may include multiple transceivers, that is, a first transceiver 202 for transmitting and receiving RF communications with network 110 and in accordance with a first air interface technology and a second transceiver 204 for transmitting and receiving RF communications with network 120 and in accordance with a second air interface technology, thereby allowing the MS to concurrently transmit or receive in each of the two networks. Each transceiver 202, 204 includes a transmitter and a receiver (not shown) and is coupled to a processor 206, which processor is further coupled to an at least one memory device 208.

In an effort to minimize cost, a designer of a multi-mode MS, such as MS 102, may attempt to share some components among two or more of the air interface technologies. For example, an MS that implements two technologies might be capable of receiving on both simultaneously but is only able to transmit on one at a time due to sharing the same transmit chain. Even if there were two separate transmit chains, it may still be desirable to transmit on only one at a time to minimize radio frequency interference between the two. Therefore, in other embodiments of the present invention, some or all of the components of transceivers 202 and 204 may be shared between the two transceivers. For example, and referring now to FIG. 3, in another embodiment of the present invention multi-mode MS 102 may include a single transceiver 302 that includes a transmitter and a receiver (not shown) and that emulates the operation of dual transceivers, such as transceivers 202 and 204. Transceiver 302 is coupled to a processor 304, which processor is further coupled to an at least one memory device 306. Processor 304 may cause transceiver 302 to rapidly switch between networks 110 and 120 to give the appearance of concurrent operation.

Each of processors 206 and 304 may comprise one or more microprocessors, microcontrollers, digital signal processors (DSPs), combinations thereof or such other devices known to those having ordinary skill in the art, which processor is configured to execute the functions described herein as being executed by MS 102. Each of at least one memory devices 208 and 306 may comprise random access memory (RAM), dynamic random access memory (DRAM), and/or read only memory (ROM) or equivalents thereof, that store data and programs that may be executed by the associated processor and that allow MS 102 to perform all functions necessary to operate in communication system 100.

The embodiments of the present invention preferably are implemented within MS 102, and more particularly with or in software programs and instructions stored in the respective at least one memory device 208, 306, and executed by respective processors 206, 304. However, one of ordinary skill in the art realizes that the embodiments of the present invention alternatively may be implemented in hardware, for example, integrated circuits (ICs), application specific integrated circuits (ASICs), and the like, such as ASICs implemented in MS 102. Based on the present disclosure, one skilled in the art will be readily capable of producing and implementing such software and/or hardware without undo experimentation.

MS 102 is capable of handoffs between RANs of the same or different air interface technologies, such as RANs 112 and 122. If the MS contains a separate, complete implementation of each air interface technology, then handoff can be accomplished without interaction between the base stations of the two technologies. This is because the connection to the new air interface technology can progress independently of the old connection to the old air interface technology. This requires no change to the specification of either technology because the handoff is handled completely by the mobile node without network involvement. However, as noted above, in an effort to minimize cost, a designer of a multi-mode MS such as MS 102 may attempt to share some components among two or more of the air interface technologies. For real-time applications such as Voice-over-Internet Protocol (VoIP), it is desirable to minimize the total handoff time to make the user experience as seamless as possible. In these cases, some interaction between the two networks 110, 120 is desirable. In particular, it is desirable to do as much setup of a new connection with a new, target network, for example, network 120, as possible while still connected to an old, source network, for example, network 110, and corresponding air interface technology.

In order to accomplish this, communication system 100 provides for tunneling the signaling and bearer data for the new connection over the old connection. A tunnel is an encapsulation of data between two points such that the intervening equipment passes it through transparently without interpretation or modification. In order to facilitate communication between MS 102 and the new, target network, that is, network 120, while the MS is still connected to the old, source network, for example, network 110, communication system 100 includes a Signal Forwarding Function (SFF) 116 that interfaces between the two networks. The functionality and operation of an SFF is described in detail in U.S. patent application Ser. No. 11/778,746, entitled "Method of Establishing a HRPD Signal Link," which application is assigned to the assignee of the present invention and is hereby incorporated by reference in its entirety.

SFF 116 is an Internet Protocol layer entity that can function in any kind of network. In communication system 100, SFF 116 terminates a tunnel between the MS and a network serving the MS, that is, source network 110, decapsulating data received by the SFF from the MS via network 110 and transferring the data to the RAN of the new, target network 120. SFF 116 further encapsulates, in signaling of the serving network 110, data received from network 120 and intended for MS 102 and transfers the encapsulated signaling to MS 102 via network 110 and air interface 104.

In various embodiments of the invention, SFF 116 may be a standalone device with a defined interface to each RAN 112, 122 (or another network node) or may be co-located with the RAN 112 of the old, source network 110 or the RAN 122 new, target network 120. The tunnel between MS 102 and SFF 116 may be based on any of multiple protocols, such as Transmission Control Protocol (TCP), User Datagram Protocol (UDP), Generic Route Encapsulation (GRE), Internet Protocol (IP), or other encapsulation schemes. The tunneling serves to insulate the air interface 104, 106 of either technology from changes that may be required in a more tightly integrated solution, such as modifying one air interface technology to carry the signaling of another and to interpret this signaling at the RAN of the currently active technology.

Figure 4:
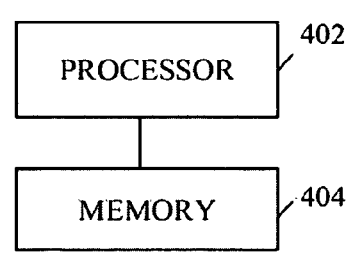
FIG. 4 is a block diagram of a Signal Forwarding Function of FIG. 1 in accordance with an embodiment of the present invention.

FIG. 4 is a block diagram of SFF 116 in accordance with an embodiment of the present invention. SFF 116 includes a processor 402, such as a microprocessor, microcontroller, digital signal processor (DSP), combination thereof or such other devices known to those having ordinary skill in the art, which processor is configured to execute the functions described herein as being executed by SFF 116. SFF 116 further includes an at least one memory device 404 coupled to processor 402, such as a random access memory (RAM), dynamic random access memory (DRAM), and/or read only memory (ROM) or equivalents thereof, that stores data and programs that may be executed by the associated processor 402 and that allow the SFF to perform all functions necessary to operate in communication system 100, such as programs for interworking between networks 110 and 120 including encapsulating data received from network 102 in a signaling format of network 110 and decapsulating, that is, removing headers and tails from, packet data received from MS 102 via network 110. At least one memory device 404 further maintains routing information for RANs, such as RANs 112 and 122, and gateways, such as gateway 114 and gateway/PDSN 124, serviced by and/or coupled to the SFF.

Figure 5:
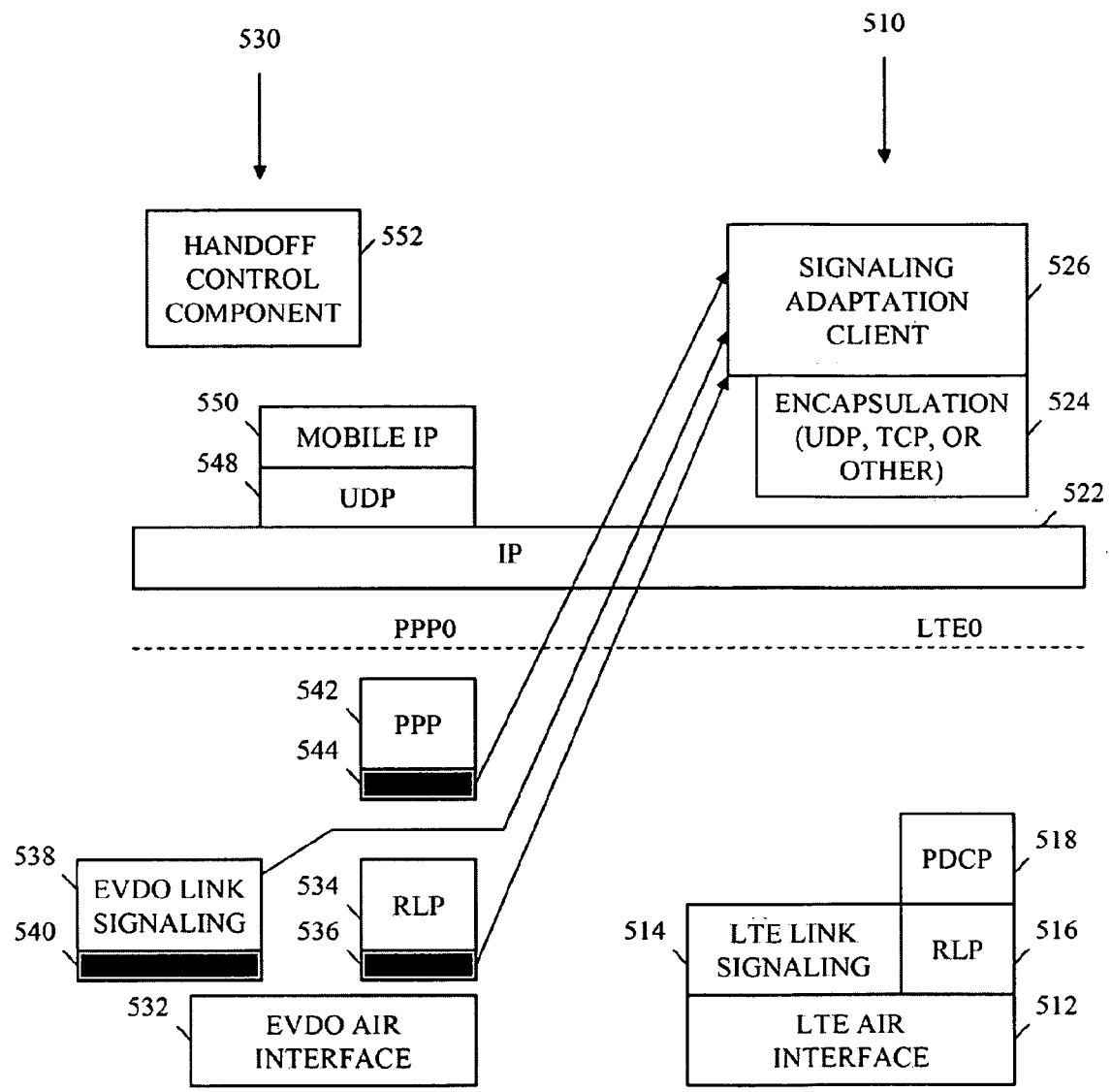
FIG. 5 is a block diagram of a protocol stack implemented in the mobile station of FIG. 1 in accordance with an embodiment of the present invention.

In order to engage in such tunneling and interact with SFF 116, MS 102 includes a novel internal protocol stack that includes points at which data may be intercepted and redirected to facilitate the handoff. Referring now to FIG. 5, a block diagram of a protocol stack implemented in MS 102 is provided in accordance with an embodiment of the invention. A layered representation of protocols is commonly known as a protocol stack. As depicted in FIG. 5, MS 102 includes multiple protocol stacks 510, 530 that respectively are associated with the multiple networks 110, 120 in which MS 102 is capable of operating. A first, source network protocol stack 510 of the multiple protocol stacks 510, 530 facilitates communications between MS 102 and source network 110 via air interface 104 and a second, target network protocol stack 530 of the multiple protocol stacks 510, 530 facilitates communications between MS 102 and target network 120 via air interface 106.

A protocol stack, such as the TCP/IP protocol stack, typically includes at least five layers, which layers are, from highest to lowest, an Application Layer, a Transport Layer, a Network Layer, a Link Layer, and a Physical Layer. The bottom layer, that is, the Physical Layer, includes the network hardware and a physical medium for the transportation of data. As depicted in FIG. 5, the Physical Layer of MS 102 includes a first Physical Layer interface, that is, LTE air interface 512, for interfacing with air interface 104 and RAN 112, and a second Physical Layer interface, that is, EVDO air interface 532, for interfacing with air interface 106 and RAN 122. Typically, Physical Layer functionality such as EVDO and LTE air interfaces 512, 532 are implemented in a transceiver of an MS, such as transceivers 202, 204, and 302, although such functionality may be distributed between the transceiver and a processor of the MS, such as processors 206 and 304.

While source network 110, air interface 106, and protocol stack 510 may be referred to herein as an LTE network, air interface, and protocol stack and target network 120, air interface 106, and protocol stack 530 may be referred to herein as an EVDO network, air interface, and protocol stack, one of ordinary skill in the art realizes that the source network, air interface, and protocol stack may be any kind of packet data network, air interface, and protocol stack, including an EVDO network, air interface, and protocol stack, and the target network, air interface, and protocol stack may be any other kind of packet data network, including an LTE network, so long as they implement different air interface technologies.

The next layer up from the Physical Layer is the Link Layer, or Layer 2, which implements protocols that assure a reliable transmission of data in a communication system that guarantees delivery of data. Layer 2 functionality of LTE protocol stack 510 includes a Radio Link Protocol (RLP) module 516, an LTE Link Layer signaling module 514, and a Packet Data Compression Protocol (PDCP) module 518.

Similarly, Layer 2 functionality of EVDO protocol stack 530 includes a Radio Link Protocol (RLP) module 534, an EVDO Link Layer signaling module 538, and a Point-to-Point Protocol (PPP) module 542.

Layer 3, or the Network Layer, is responsible for delivering data across a series of different physical networks that interconnect a source of the data and a destination for the data. Routing protocols, for example, an IP (Internet Protocol) protocol module 522 such as IPv4 or IPv6, are included in the network layer. An IP data packet exchanged between peer network layers includes an IP header containing information for the IP protocol and data for the higher level protocols. The IP header includes a Protocol Identification field and further includes transport addresses, typically IP addresses, corresponding to each of a transport layer sourcing the data packet and a transport layer destination of the data packet. A transport address uniquely identifies an interface that is capable of sending and receiving data packets to transport layers via the network layer.

The next layer up from the Network Layer is the Transport Layer. As is known in the art, the Transport Layer is responsible for delivering data to an appropriate application process. This involves forming data packets and adding source and destination identifiers, such as port numbers, in the header of each transport layer data packet. As depicted in FIG. 5, the Transport Layer of LTE protocol stack 510 includes a first encapsulation module 524 that may utilize any of several Transport Layer protocols, such as the User Datagram Protocol (UDP) or Transmission Control Protocol (TCP), to encapsulate data received from the application layer or to remove headers of packets received from the Network Layer. Further, as depicted in FIG. 5, the Transport Layer of EVDO protocol stack 530 includes a second encapsulation module 548, such as a User Datagram Protocol (UDP) module, to encapsulate data received from the application layer or to remove headers of packets received from the Network Layer. The Transport Layer of EVDO protocol stack 530 further includes a Mobile IP module 550 that interfaces with the second encapsulation module 548.

Protocol stack functionality corresponding to RLP modules 516 and 534, LTE Link Layer signaling module 514, EVDO Link Layer signaling module 538, PDCP module 518, PPP module 542, IP protocol module 522, UDP/TCP/encapsulation modules 524, 548 and Mobile IP module 550 are well known in the art and will not be described herein in detail. However, unlike protocol stacks of the prior art, the target network protocol stack 530 further includes multiple Link Layer "shims" 536, 540, and 544. Shims 536, 540, and 544 are software modules associated with RLP module 534, EVDO Link Layer signaling module 538, and PPP module 542, respectively. The shims 536, 540, and 544 intercept signaling and data from the target network, that is, EVDO, protocol stack 530 that is intended for peers in EVDO network 120 and route the intercepted signaling and data to an Application Layer Signaling Adaptation Client (SAC) 526 associated with source network protocol stack 510. SAC 526 then routes the intercepted signaling and data to the target network 120 and in particular to target RAN 122, via the source side 510 of the protocol stack, source air interface 104, source network 110, and SFF 116.

As depicted in FIG. 5, separate shims 536, 540, and 544 are provided for EVDO signaling, RLP setup, and PPP setup. Shim 536 intercepts RLP signaling only, shim 540 intercepts other, non-RLP, EVDO Link Layer signaling, and shim 544 intercepts signaling and/or actual bearer data underneath PPP module 542. If the data were to pass through RLP, the data would come out segmented into RLP frames and RLP would run its retransmission protocol. This would produce suboptimal results because RLP would continue to run on the data as the data is passed through the LTE protocol stack 510, producing RLP-over-RLP. The retransmission mechanisms of the two RLP instances 516, 534 would be likely to interact badly. For example, a lost frame over the air might produce two NAKs instead of the one NAK needed to retransmit on the lower RLP. Note that in all three cases, the shims produce data that is tunneled through the SFF 116 to the target, EVDO RAN 122. For EVDO link signaling, RAN 122 responds with UATI assignment and other configuration setup. For RLP signaling, the target EVDO RAN 122 responds with the appropriate signaling to establish an RLP state. For the data coming from PPP (including Link Control Protocol (LCP), IP Control Protocol (IPCP), and Mobile IP protocols supported by PPP), RAN 122 relays the data to the PDSN 124 over an A10 connection.

The protocol stacks of MS 102 further includes an Application Layer shim control module, that is, a Handoff Control Component (HCC) 552, and SAC 526. HCC 552 is associated with the target network protocol stack 530 and is responsible for enabling, or turning on, the interception shims 536, 540, and 544, thereby redirecting signaling and data from the target network protocol stack 530 to the source network protocol stack 510 and air interface 104/source network 110. After turning on the interception shims 536, 540, and 544, HCC 552 waits until pre-establishment of the handoff is complete and then, subsequent to establishing a context/registration state in association with network 120 and authenticating the MS with network 120 and prior to completing the actual air interface handoff, disables, or turns off, the shims and thereby allows data to flow to RAN 122 via the EVDO protocol stack 530, including EVDO air interface 532 of MS 102, and the EVDO air interface 106. HCC 526 also interacts with the Mobile IP module 550 to trigger a sending of Registration Requests (or Binding Updates for Mobile IPv6). Registration Requests preferably are only be sent on the EVDO air interface 106 and are suppressed for the LTE air interface 104.

SAC 526 includes a tunnel client that sets up a tunnel with, and tunnels data to, SFF 116 via a source network, such as network 110, when the MS is pre-establishing a handoff in a target network, such as network 120. That is, SAC 526 is the component of MS 102 that connects to the SFF 116 of the infrastructure of communication system 100 and transmits the three kinds of data, that is, the EVDO link signaling, the RLP negotiation, and the PPP signaling and bearer data, to the SFF, preferably on separate connections. By utilizing separate connections for each of the three kinds of data, the ultimate recipient of the data, that is, a target RAN of the target network, that is, RAN 122, may more easily separate the three different interfaces and place the data on the right path inside the RAN. For example, when the target network is an EVDO network and the target RAN is an EVDO RAN, the EVDO link signaling should be fed to EVDO connection setup protocols in the RAN, RLP negotiations should be sent to an RLP protocol in the RAN, and PPP signaling and bearer data should be sent by the RAN to an EVDO gateway, that is, should be sent over an A10/A11 connection to PDSN 124. It will occur to one of ordinary skill in the art that the transfer of data by the shims 536, 540, and 544 to the tunnel client of SAC 526 could have many possible implementations. For example, in one embodiment of the invention the transfer of data by the shims to SAC 526 may be a kernel-space to user-space communication. Preferably, RLP modules 516 and 534, LTE Link Layer signaling module 514, PDCP module 518, EVDO Link Layer signaling module 538, PPP module 542, shims 536, 540, and 544, IP module 522, encapsulation modules 524 and 548, mobile IP module 550, SAC 526, and HCC 552 are software modules that are maintained in the at least one memory device of 208, 306 of MS 102 and that are executed by the processor 206, 304 of the MS.

In communication system 100, MS 102 may roam through the system when the subscriber unit is engaged in a communication session with source network 110. As a result of the roaming, situations may arise where it is desirable to hand off MS 102 from network 110 to network 120. For example and as is known in the art, while roaming in communication system 100 and being serviced by RAN 112, MS 102 may receive a stronger signal from RAN 122. Typically signal strengths are determined by an MS, such as MS 102, measuring a pilot channel associated with the RAN. When a pilot channel of a serving RAN is weaker than a threshold value and a pilot channel of another RAN, that typically indicates a desirability of a handoff.

By way of another example, the costs associated with operating MS 102 on network 110 may be different from the costs associated with operating the MS on network 120. As a result, a user of MS 102 may program into the subscriber a directive to operate on the lower cost network whenever the subscriber unit is able to obtain a traffic channel in the lower cost network. By way of still other examples, for load leveling purposes or due to a need to clear traffic channels in a coverage area in order to facilitate emergency communications, an operator of a communication system such as communication system 100 may find it desirable to move an MS, such as subscriber unit 102, that is actively engaged in a voice call in a first network, such as network 110, to the other network.

In order to expedite a handoff of an MS such as MS 102, communication system 100 provides a method and apparatus for a pre-establishment of a handoff with a network that is a potential target of the handoff. By providing for pre-establishment of a handoff, that is, for creating a context, or registration state, for the MS in the potential target network and at an HA and getting authenticated by the potential target network and HA in preparation for a handoff to the target network, but prior to determining to effectuate an actual handoff to an air interface of the target network or at least without initiating a setup of a connection in the air interface of the target network, communication system 100 minimizes an amount of time that it takes for the MS to establish a connection with the target network, thereby reducing a likelihood of a call drop or a loss of voice traffic during the handoff.

Figure 6:
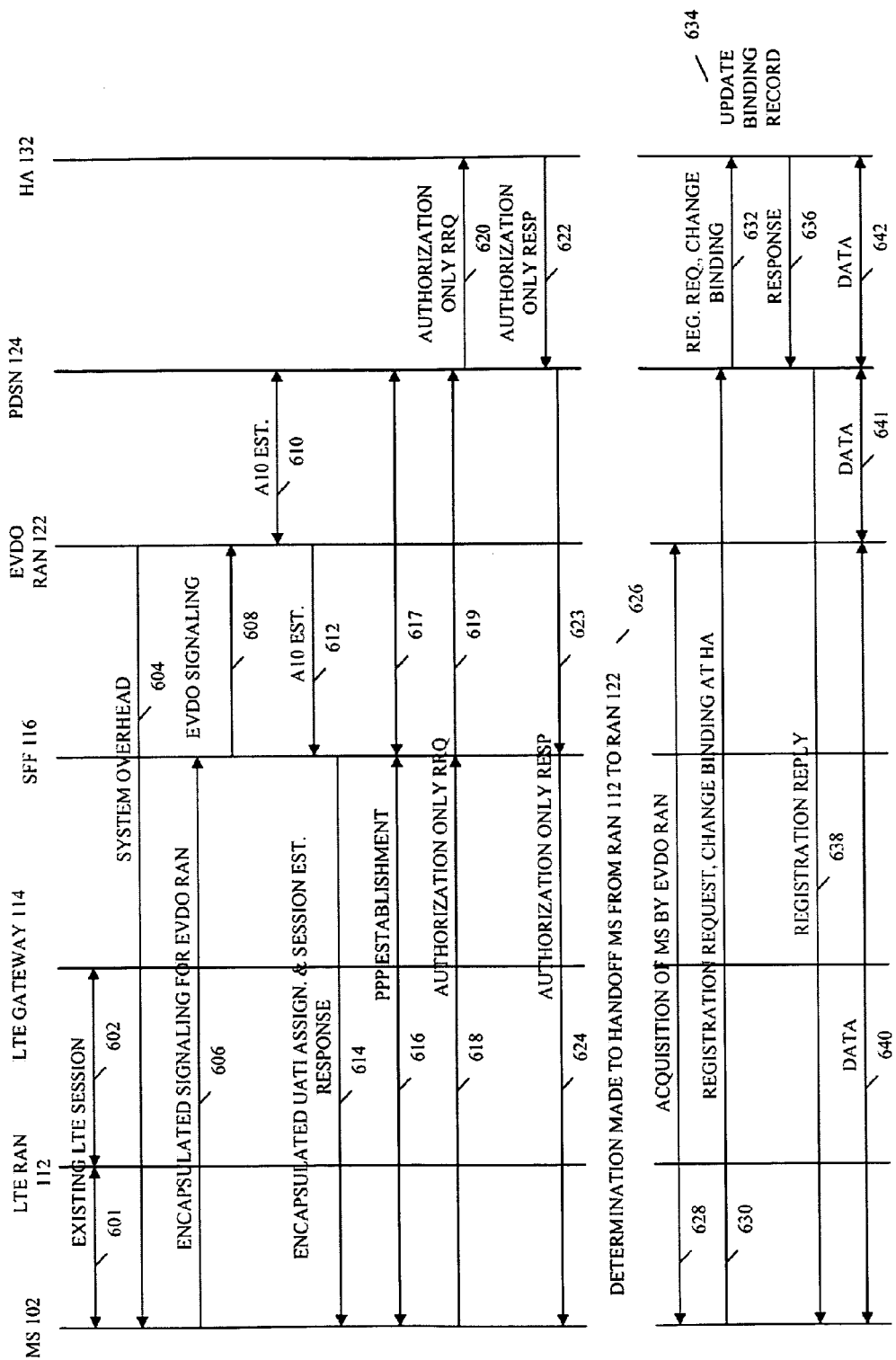
FIG. 6 is a signal flow diagram illustrating an inter-technology handoff of a communication session from a source network to a target network of the communication system of FIG. 1 in accordance with various embodiments of the present invention.

FIG. 6 is a signal flow diagram 600 of a handoff executed by communication system 100 in handing off a communication session from a first, source network, that is, network 110, to a second, target network, that is, network 120, in accordance with various embodiments of the present invention. Signal flow diagram 600 begins when MS 102 is actively engaged 601, 602 in a communication session, such as a VoIP call, and exchanges bearer data with a remote party (not shown) via a bearer path established through network 110, and more particularly via RAN 112 and gateway 114. In order to participate in a VoIP call via network 110, MS 102 must already be registered with network 110 and HA 132. For the purpose of illustrating the principles of the present invention and not intending to limit the invention in any way, it is assumed herein that source network 110 operates according to the LTE standards (and that the session established between MS 102 and network 110 is an LTE session) and that target network 120 operates according to the EVDO standards; however, as noted above, each of source network 110 and target network 120 may operate according to any packet data network standard so long as they operate pursuant to different standards. For example, source network 110 may operate according to the EVDO standards and target network 120 may operate according to the LTE standards, or one of source network 110 and target network 120 may operate according the WiMAX (IEEE 802.16) standard.

While engaged in a communication session with network 110, MS 102 monitors 604 other networks, such as network 120. For example, MS 102 may listen for EVDO system overhead messages of network 120, such as a pilot signal broadcast by target RAN 122. In response to detecting a potential target network, that is network 120, MS 102 initiates a process of pre-establishing a connection with the potential target network by tunneling signaling to the target network via source network 110, that is, via air interface 104, RAN 112, and gateway 114, and via SFF 116. In various embodiments of the present invention, MS 102 may not initiate the process of pre-establishing a connection until the signal detected from RAN 120 exceeds a first pre-establishment threshold and/or a signal received from source RAN 110 falls below a second pre-establishment threshold, which pre-establishment thresholds are maintained in the at least one memory device 208, 306 of the MS.

In pre-establishing a connection with target network 120, MS 102 creates a context for the MS in target network 120 and at HA 132 and gets authenticated by the target network and HA in preparation for a handoff to the target network, but without initiating a setup of a connection in air interface 106 and network 120 for the MS and without directing, that is, re-routing, bearer data to air interface 106 and network 120. As part of pre-establishing the connection with target network 120, MS 102 may perform Link Layer signaling that is a prerequisite to establishing a traffic, or bearer, link in network 120 and establishes a context, or registration state, in network 120, including establishing Link Layer, RLP, PPP, and Mobile IP contexts in network 120. For example, MS 102 may set up a Traffic Flow Template (TFT) at PDSN 124, negotiating Quality of Service (QoS) parameters for an IP flow though the target network and negotiating RLP retransmission parameters. By way of another example, in pre-establishing the connection with target network 120 MS 102 may establish PPP state parameters with PDSN 124, including service link layer parameters for an IP link with target network 120 and the PDSN, running LCP to configure the IP link, and negotiating IPCP to configure the IP link.

In order to pre-establish the connection with target network 120, MS 102 tunnels 606 EVDO signaling, encapsulated in data packets of source network 110, to SFF 116 via air interface 104 and source network 110. For example, the EVDO signaling may be included in a payload of a source network data packet. The EVDO signaling identifies the sender, that is, MS 102, and a destination, that is, RAN 122 or PDSN 124, and includes a request for a mobile identifier, preferably a Unicast Access Terminal Identifier (UATI), in the target network. Preferably, MS 102 obtains routing information for SFF 116 by performing a Domain Name Service (DNS) (not shown) look up for the current subnet of the MS, which subnet includes RAN 112, gateway 114 and SFF 116. In turn, the SFF 116 may maintain routing information for RAN 122 and PDSN 124 or may be on a same network and/or subnet as the RAN and is able to obtain routing information for the RAN and PDSN by performing a DNS look up.

When SFF 116 receives a data packet from MS 102 and intended for RAN 122, the SFF removes the EVDO signaling from the data packet and forwards 608 the EVDO signaling to EVDO RAN 122. When RAN 122 receives the EVDO signaling from MS 102, the RAN determines that no A10 connection has been established for MS 102 and selects a PDSN, that is, PDSN 124, for establishment of a bearer path for the MS. RAN 122 then sets up 610 an A10 connection with PDSN 124. For example, RAN 122 may convey a registration request to PDSN 124, such as an A-11 Registration Request. PDSN 124 accepts the registration request, for example, by conveying an A-11 Registration Reply back to the RAN, and updates A10 connection binding information for MS 102 at the PDSN to point to RAN 122. PDSN 124 further assigns a mobile identifier, for example, a UATI, to MS 102 for use in network 120 and provides the assigned mobile identifier, that is, the UATI assignment, as well as session information, such as session protocols and protocol configurations, for example, QoS and RLP parameters, to SFF 116 via RAN 122.

In response to being informed of the acceptance of the registration request by PDSN 124 and to receipt of the UATI and session information from the PDSN, RAN 122 conveys 612 EVDO messaging to SFF 116 informing of the establishment of the A10 connection and providing the UATI assignment and session information. SFF 116 encapsulates the messaging received from RAN 122 in a control signal of source network 110, for example, by including the EVDO messaging in a payload of a source network control signal. SFF 116 then forwards 614 the encapsulated messaging, comprising the UATI assignment and session information, to MS 102 via gateway 114, RAN 112 and air interface 104.

In response to receiving the UATI assignment and session information for network 120, MS 102 negotiates establishment of, and establishes, 616, 617 a PPP connection with PDSN 124 via SFF 116 and RAN 122. These negotiations are handled in accordance with well-known PPP negotiation techniques except that shim 544 of MS 102 routes EVDO PPP signaling to SAC 526 of the MS and the SAC encapsulates the EVDO PPP signaling in signaling of network 110 and tunnels the encapsulated signaling to SFF 116 via air interface 104, RAN 112 and gateway 114. SFF 116 decapsulates the received EVDO PPP signaling, that is, removes the EVDO PPP signaling from the encapsulated signaling received from gateway 114, and forwards the EVDO PPP signaling to PDSN 124 via RAN 122. Similarly, SFF 116 encapsulates EVDO signaling received from PDSN 124 in data packets of network 110 and forwards the encapsulated data packets to MS 102 via gateway 114, RAN 112, and air interface 104. When MS 102 receives the encapsulated signaling, the signaling is decapsulated and routed to SAC 526, which then routes the decapsulated EVDO PPP signaling to PPP module 542.

In response to establishing the PPP connection, MS 102 performs an authentication with network 120 by sending 618, 619, 620 an 'authorization only' Registration Request message to HA 132 via network 110, SFF 116, and PDSN 124. More particularly, Mobile IP module, or client, 550 of MS 102 generates the 'authorization only' Registration Request message and routes the message to PPP module 544. Shim 544 then routes the message to SAC 526 of MS 102, which encapsulates the message in a network 110 control message and tunnels 618 the message to SFF 116. SFF 116 decapsulates the control message and forwards 619 the decapsulated 'authorization only' Registration Request message to a Mobile IP module of PDSN 124. The 'authorization only' Registration Request message, preferably an Authentication Only Registration Request, requests that PDSN 124 perform authentication, of the MS to use IP services, using the challenge-response mechanism built into EVDO Mobile IP session establishment but without creating a binding at the HA. In response to receiving of the 'authorization only' Registration Request message, the Mobile IP module of PDSN 124 conveys 620 an 'authorization only' Registration Request message to HA 132 and authenticates 620, 622 MS 102 with HA 132 to use Mobile IP services, receiving an 'authorization only' Registration Response message from the HA in return. In addition, in response to receiving the 'authorization only' Registration Request message, network 120, preferably PDSN 124 or alternatively RAN 122, assigns, and stores, MS 102 a new routing identifier, that is, a new Care of Address (CoA) and more particularly an IP address, in association with network 120 and associates the new routing identifier/CoA with the negotiated MS 102/network 120 TFT/QoS parameters. At this point PDSN 124 may or may not convey the new routing identifier to HA 132. However, in the event PDSN 124 conveys the new routing identifier to HA 132, HA 132 merely stores the received routing identifier and does not create a binding at the HA between the routing identifier and MS 102's home IP address. PDSN 124 then confirms the authentication of MS 102 and conveys the assigned network 120 routing identifier by conveying 623, 624 an 'authorization only' Registration Response message back the MS via SFF 116 and the network 110/air interface 104 tunnel between the SFF and the MS.

In contrast to the 'authorization only' Registration Request message used by communication system 100, registration request messages of the prior art create a binding at the HA of a home IP address of the MS that is maintained at the HA to a new Care of Address (CoA), that is, an IP address, for the MS in target network, which IP address is linked to a rerouting of IP data and trigger a rerouting of traffic to the MS via the target network, that is, a switch of a bearer path for the MS from a source network and technology to the target network and technology. However, in communication system 100, a rerouting of data from a source network to a potential target network is avoided at the time of pre-establishment and thus a registration message is used that triggers an authentication of the MS and an assignment of an IP address to the MS in target network 120 without triggering a switch of a bearer path for the MS from source network 110 to target network 120. In various embodiments of the present invention, the Authentication Only Registration Request may be a Registration Request with a Lifetime of zero or it may be explicitly called out as a new message. HA 132 is a modified version of an HA as currently known in the art, which HA is modified to support the 'authorization only' Registration Request message. In response to receiving the Registration Request from PDSN 124, HA 132 conveys 622 key distribution information to the PDSN and sets up a Mobile IP Security (IPSec) association for MS 102, but does not actually forward data packets to the MS.

At some point in time subsequent to the authentication of MS 102 in network 120 and to the negotiation of link layer parameters, such as QoS and RLP transmission parameters, for a session between MS 102 and network 120, a determination 626 is made to handover the MS from source network 110 and source RAN 112 to target network 120 and target RAN 122. The determination may be made by MS 102 or by the infrastructure of communication system 100. For example, the handover may be indicated by any one or more of a signal, such as a pilot signal, broadcast by RAN 112 and received by MS 102 dropping below a first handoff or drop threshold, a signal, such as a pilot signal, broadcast by RAN 122 and received by MS 102, exceeding a second handoff or add threshold, and a signal received by RAN 112 from MS 102 falling below a third handoff threshold. By way of other examples, a load of RAN 112 may exceed a load threshold or a need to clear traffic channels in a coverage area may reach a critical point such that it may be desirable to move MS 102 to a new network.

In response to determining to handoff MS 102 from source network 110 and RAN 112 to target network 120 and RAN 122, MS 102 is acquired 628 by RAN 122. For example, in response to determining to handoff or to being instructed by the infrastructure to initiate a handoff of the bearer path, MS 102, and in particular, EVDO Link Layer signaling module 538 via shim 540 and SAC 526, may send a route update message and a connection request message to target RAN 122 via network 110 and SFF 116. In response, target RAN 122 conveys a traffic channel assignment to MS 102 via SFF 116 and network 110, that is gateway 114 and RAN 112. Again, as these messages are exchanged by MS 102 and SFF 116, SAC 526 of the MS encapsulates EVDO messages intended for RAN 122 in network 110 control messages and decapsulates network 110 control messages received from SFF 116, and SFF 116 encapsulates EVDO messages received from RAN 122 in network 110 control messages and decapsulates network 110 control messages received from MS 102. Alternatively, RAN 122 may convey the traffic channel assignment directly to MS 102 via a control channel of air interface 106. RAN 122 further performs flow control with PDSN 124 to inform the PDSN that it should buffer data for MS 102. At some point in time after the traffic channel assignment is conveyed to MS 102 and flow control is performed with PDSN 124, MS 102 releases its bearers in network 110.

In response to receiving the traffic channel assignment, MS 102 conveys 630 a registration request, such as a Mobile IP Registration Request as is known in the art, to PDSN 124 via RAN 122 and air interface 106. The registration request requests that MS 102 be registered in network 120 and that HA 132 update MS 102's binding record to reflect that the MS is now being served by network 120, that is, to update the MS's binding record with the new CoA, that is, an IP address, associated with network 120.

In response to receiving the registration request, PDSN 124 conveys 632 a registration request, for example, forwards the Mobile IP Registration Request received from MS 102, to HA 132. If PDSN 124 has not yet conveyed, to HA 132, the new routing identifier assigned to MS 102, then the PDSN further conveys the routing identifier to the HA. HA 132 updates 634 its binding record for MS 102 by associating the new CoA of MS 102 in network 120 with the MS's record. However, PDSN 124 and HA 132 need not authenticate MS 102 as the MS has already been authenticated pursuant to the earlier exchange of the 'authorization only' Registration Request and Registration Response. Furthermore, network 120 does not need to assign a routing identifier to the MS 102 as the assignment has earlier occurred. HA 132 then confirms 636 the update with PDSN 124, preferably by conveying to the PDSN a registration reply that confirms of the update and that includes MS 102's routing address in network 110. In response to being informed that the update is complete, PDSN 124 starts an accounting record for MS 102 and confirms 638, to MS 102, that the MS is registered in network 120, preferably by conveying a registration reply to the MS via RAN 122 and air interface 106. At this point, HA 132 begins exchanging 640-642 data traffic with MS 102 via PDSN 124 and RAN 122 and signal flow diagram 600 ends.

In other embodiments of the present invention, MS 102 may want to receive traffic on multiple interfaces simultaneously. To support this, MS 102 might use an existing Mobile IPv4 Registration Request with the 'S' (Simultaneous bindings) bit set, which tells HA 132 to begin tunneling to a new Care of Address (CoA) while continuing to tunnel to the old CoA. Packets are duplicated and sent to each binding. When MS 102 sends a subsequent Registration Request with the 'S' bit clear, HA 132 begins tunneling to the new CoA and stops tunneling on all the other CoAs. If MS 102 wants to tear down only one binding, the MS may send a Registration Request with the 'S' bit set but a Lifetime of zero. In this manner, MS 102 can arbitrarily re-configure the set of bindings on which HA 132 is sending traffic to the MS. It should be noted that in some handoff situations, the Registration Request tearing down a binding might arrive at HA 132 prior to some traffic that was also in flight to the HA. In this case, HA 132 may implement "bi-receiving" for those packets, continuing to process them, for some pre-determined period of time, as the HA would have had the binding not been torn down.

By providing for a pre-establishment of a connection between a potential target network and a roaming MS, a set up time with the target network can be greatly reduced when the decision to handover the MS is subsequently made. In fact, in a dual mode MS that includes shared components for receive or transmit paths associated with the source and target networks, the handoff set up time may be reduced by as much as five seconds by pre-establishing a connection with the target network. To facilitate the pre-establishment of a connection, the MS is provided with modified protocol stacks that enables the pre-establishment of a connection with the target network, for example, an EVDO network, while the MS is connected to the source network, for example, an LTE network. The modified protocol stacks includes multiple shims at multiple layers in the target network protocol stack, for example, below the EVDO signaling stack, below the RLP layer, and below the PPP layer. The MS further includes a Handoff Control Component to switch the shims on and off and to trigger the appropriate kind of Registration Request, and a Signaling Adaptation Client to act as an encapsulation/decapsulation point for data and signaling. Communication system 100 further includes a new Mobile IP message, that is, an Authentication Only Registration Request, that provides for authentication of the MS and registration of the MS with the target network at an HA without updating a binding at the HA for the MS in the target network, thereby not initiating a re-routing of data to the MS via the target network while still in the pre-establishment phase.

While the present invention has been particularly shown and described with reference to particular embodiments thereof, it will be understood by those skilled in the art that various changes may be made and equivalents substituted for elements thereof without departing from the scope of the invention as set forth in the claims below. Furthermore, one of ordinary skill in the art realizes that the components and operations of the transmitting communication device and receiving communication device detailed herein are not intended to be exhaustive but are merely provided to enhance an understanding and appreciation for the inventive principles and advantages of the present invention, rather than to limit in any manner the invention. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method performed by a multi-mode mobile station for an inter-technology handoff of a communication session from a first network associated with a first radio frequency (RF) technology to a second network associated with a second RF technology, the method comprising:
    exchanging bearer data with the first network via the first RF technology;
    detecting an availability of the second network associated with the second RF technology in response to receiving a system overhead message via the second RF technology;
    intercepting and encapsulating signaling of the second RF technology;
    tunneling the encapsulated signaling to the second network via the first RF technology and first network;
    establishing a registration state in the second network via the tunnel, without directing bearer data to the second RF technology, without creating a binding at a Home Agent of a home address of the mobile station, and while continuing to exchange bearer data with the first network via the first RF technology;
    subsequently determining whether to hand off service from the first network associated with the first RF technology to the second network associated with the second RF technology; and
    in response to determining to hand off service from the first network to the second network, and subsequent to establishing the registration state in the second network, handing off to the second network associated with the second RF technology and ceasing tunneling the encapsulated signaling to the second network via the first RF technology.

2. The method of claim 1, wherein establishing a registration state comprises setting up a Traffic Flow Template at the second network.

3. The method of claim 2, wherein establishing the registration state further comprises obtaining a routing identifier that is associated with the second network and the Traffic Flow Template.

4. The method of claim 1, wherein determining whether to hand off service from the first network to the second network is based on one or more of signal strengths of signals received via the first RF technology and the second RF technology, costs associated with communications transmitted via the first RF technology and the second RF technology, and a current load level of traffic in the first network and the second network.

5. The method of claim 1, further comprising performing an authentication of the mobile station with the second network via the first radio frequency technology, without directing bearer data to the second radio frequency technology.

6. The method of claim 5, wherein performing an authentication without directing bearer data to the second radio frequency technology comprises conveying an Authentication Only Registration Request message to the second network.

7. A multi-mode mobile station capable of operating in each of a first network associated with a first radio frequency (RF) technology and a second network associated with a second RF technology, the mobile station comprising:

at least one transceiver for transmitting and receiving RF communications;

at least one memory device that maintains a first protocol stack associated with the first RF technology and a second protocol stack associated with the second RF technology, wherein the second protocol stack comprises a shim that intercepts second protocol stack signaling and redirects the intercepted signaling to an application layer client in the first protocol stack that encapsulates the intercepted signaling for tunneling to the first network; and a processor coupled to the at least one memory device and the at least one transceiver that implements the first and second protocol stacks, and further configured to:

exchange bearer data with the first network via the transceiver and first RF technology;

detect an availability of the second network associated with the second RF technology in response to receiving a system overhead message via the transceiver and second RF technology;

tunnel the encapsulated signaling to the second network via the encapsulation module, transceiver, and first network;

establish a registration state in the second network via the transceiver and tunnel, without directing bearer data to the second RF technology, without creating a binding at a Home Agent of a home address of the mobile station, and while continuing to exchange bearer data with the first network via the transceiver and first RF technology;

subsequently determine whether to hand off service from the first network associated with the first RF technology to the second network associated with the second RF technology; and in response to a determination to hand off service from the first network to the second network, and subsequent to establishing the registration state in the second network, hand off to the second network associated with the second RF technology and cease tunneling the encapsulated signaling to the second network via the first network by disabling the shim.

8. The multi-mode mobile station of claim 7, wherein the processor is configured to determine whether to hand off service from the first network to the second network based on one or more of signal strengths of signals received via the first RF technology and the second RF technology, costs associated with communications transmitted via the first RF technology and the second RF technology, and a current load level of traffic in the first network and the second network.

9. The multi-mode mobile station of claim 7, wherein the shim redirects the intercepted signaling to an application layer client of the first protocol stack that conveys the signaling to the first network via the first protocol stack.

10. The multi-mode mobile station of claim 9, wherein the application layer client encapsulates the intercepted signaling received from the shim in a control message of the first network to produce an encapsulated signal and conveys the encapsulated signal to the first network via the first protocol stack.

11. The multi-mode mobile station of claim 7, wherein the second protocol stack comprises an application layer shim control module operable to enable and disable the shim.

12. The multi-mode mobile station of claim 11, wherein the shim control module enables the shim in order to one or more of establish, via the first network, a registration state for the mobile station in association with the second network and authenticate, via the first network, the mobile station in association with the second network and without directing bearer data to the second network and disables the shim subsequent to the one or more of establishing the registration state and authenticating the mobile station and further prior to completing a handoff of the mobile station to an air interface associated with the second network.

13. The multi-mode mobile station of claim 7, wherein the second protocol stack comprises one or more shims and wherein the one or more shims intercept one more of Radio Link Protocol signaling, non-Radio Link Protocol link layer signaling, and Point-to-Point Protocol signaling.

14. A method for an inter-technology handoff of a communication session from a first radio frequency (RF) technology to a second RF technology, the method comprising:

exchanging bearer data with a mobile station via the first RF technology;

receiving, via the first RF technology, a Mobile Internet Protocol (MIP) request to authenticate the mobile station to provide IP services in association with the second RF technology, wherein the request does not trigger a rerouting of traffic to the mobile station via the second RF technology;

receiving, via the first RF technology, a request to assign a routing identifier to the mobile station by use of MIP and in association with the second RF technology, wherein the request does not trigger a rerouting of traffic to the mobile station via the second RF technology;

in response to receiving the authentication request, a mobility agent authenticating the mobile station in association with the second RF technology;

in response to receiving the a request to assign a routing identifier, assigning a routing identifier in association with the second RF technology;

subsequent to authenticating the mobile station and assigning a routing identifier in association with the second RF technology, determining to handoff the mobile station to the second RF technology;

handing off the mobile station to the second RF technology; and rerouting the bearer data by the mobility agent from first RF technology to second RF technology based on a registration request sent on the second RF technology and which does not require further authentication or further routing identifier assignment.

15. The method of claim 14, further comprising, prior to determining to handoff the mobile station to the second radio frequency (RF) technology, negotiating, via the first RF technology, a registration state of the mobile station in association with the second RF technology.

16. The method of claim 15, wherein negotiating a registration state comprises negotiating one or more of Radio Link Protocol parameters, Quality of Service parameters, and Point-to-Point Protocol parameters.

17. The method of claim 15, wherein negotiating a registration state comprises setting up a Traffic Flow Template in association with the second radio frequency technology.

18. The method of claim 17, further comprising providing, to the mobile station, the routing identifier associated with the second radio frequency technology and associating the routing identifier with the Traffic Flow Template without creating a binding at a Home Agent of a home address of the mobile station and the routing identifier.

* * * * *